3,184,258
VEHICLE LOCKING HUB
John M. Kapusta, Stickney, Ill., assignor to Cutlas Tool
and Mfg. Co., Lyons, Ill., a corporation of Illinois
Filed Aug. 16, 1961, Ser. No. 131,883
2 Claims. (Cl. 287—53)

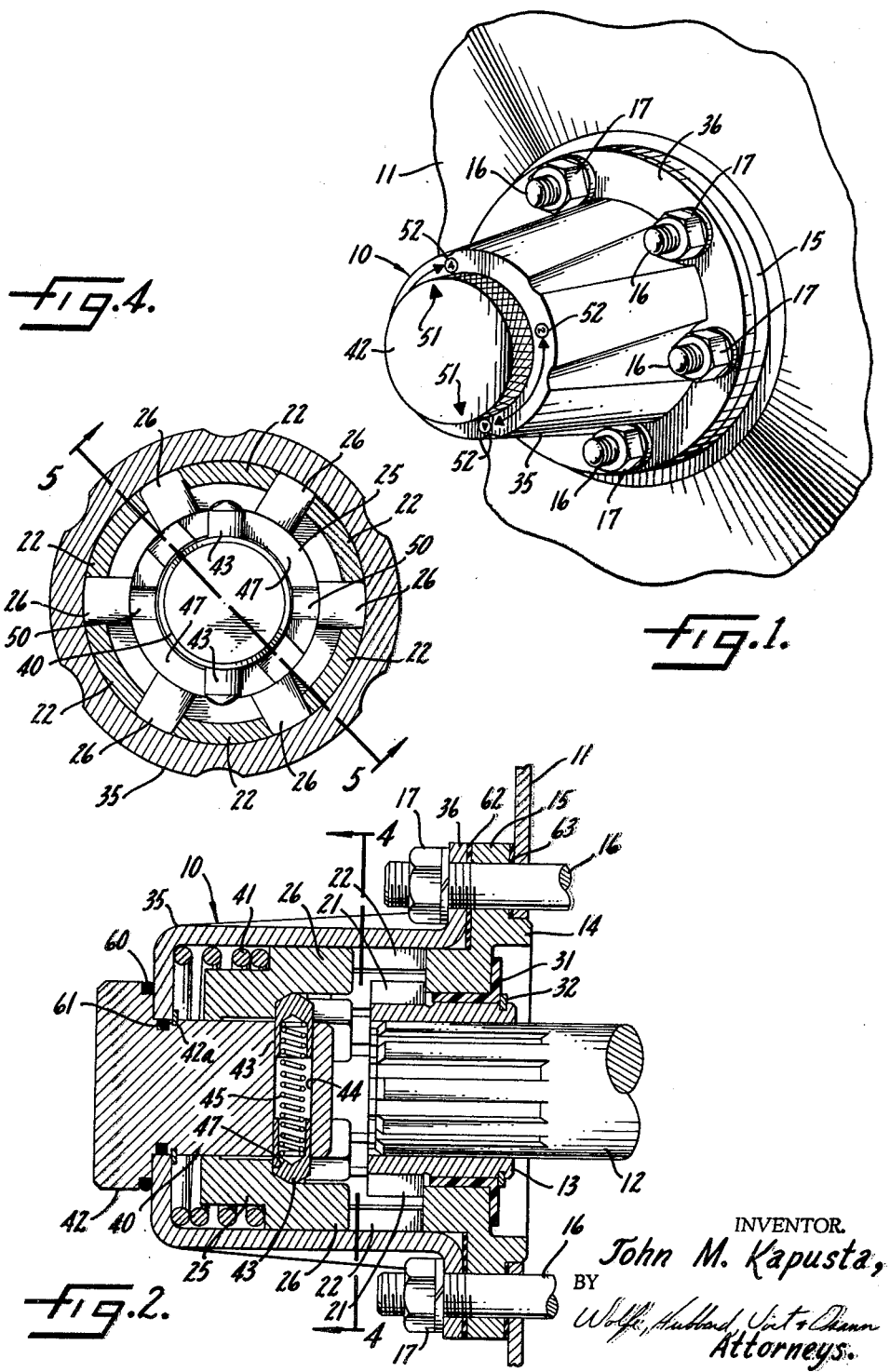

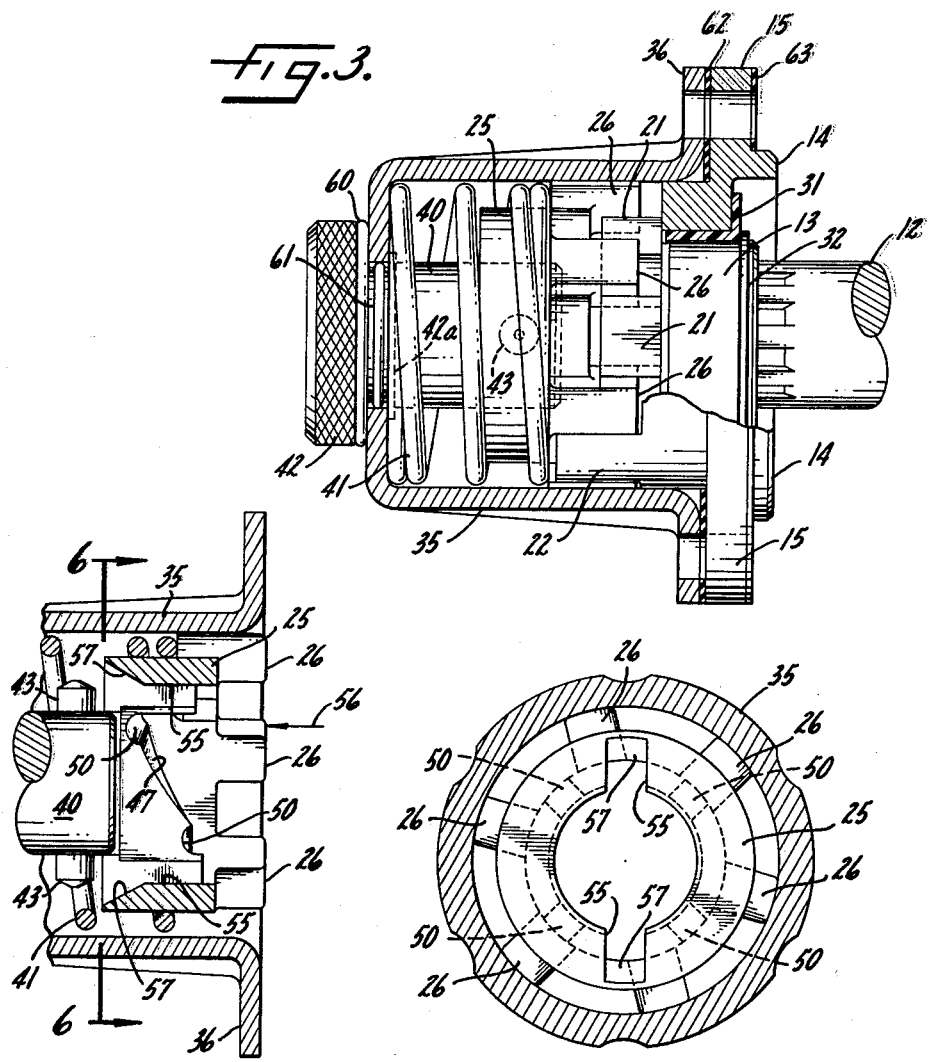

This invention relates generally to vehicle hubs and more particularly concerns a lockable hub for selectively coupling a vehicle wheel to its axle.

When operating four wheel drive vehicles, it has been found desirable to uncouple the front wheels from their axles when the vehicle is operated in normal rear wheel drive. This avoids running the front differential and associated parts by rotation of the front wheels.

For this purpose, special locking hubs are utilized to mount the front wheel of four wheel drive vehicles on their front axles. Such locking hubs include devices for selectively disconnecting the supported wheels from their axles.

It is the primary aim of the present invention to provide an improved locking hub for the purpose described above that can be locked or unlocked manually without an auxiliary tool of any kind being used. A related object is to provide a hub of the above kind which is easily operated, no great force being required, and which functions with complete reliability.

Another object of the invention is to provide a hub as characterized above that can be easily assembled for initial manufacture as well as being suited for convenient disassembly and reassembly for servicing purposes.

A further object is to provide a hub of the above type which is compact and particularly economical to manufacture.

Moreover, it is an important object to provide a hub having the above features and advantages which is also quite strong and which gives a solid locking action to the extent of maintaining the lock between hub and wheel once the locking element is set in locked position even in the event of cracking or other failure of the locking element.

Other objects and advantages of the invention will become apparent upon reading the following detailed description and upon reference to the drawings, in which:

FIGURE 1 is a fragmentary perspective of a vehicle wheel mounted on a hub constructed in accordance with the present invention;

FIG. 2 is a slightly enlarged longitudinal section of the hub shown in FIG. 1;

FIG. 3 is a section similar to FIG. 2 showing the parts of the hub in their locked positions;

FIG. 4 is a section taken approximately along the line 4—4 of FIG. 2;

FIG. 5 is a section taken approximately along the line 5—5 of FIG. 4 and showing certain of the hub parts in disassembled relation; and FIG. 6 is a section taken approximately along the line 6—6 of FIG. 5.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown a hub 10 constructed in accordance with the invention and arranged to selectively secure a vehicle wheel 11 to its mounting axle 12. The hub 10 includes a pair of interfitted annular members 13 and 14, one of which is secured to the axle 12 and the other to the wheel 11. In the illustrated construction, the member 13 is directly splined onto the end of the axle 12. The member 14 is formed with an annular flange 15 which receives a plurality of stud bolts 16 anchored in the brake assembly (not shown) of the wheel assembly. The wheel 11 is also formed with a plurality of apertures which permit the wheel to be fitted over the stud bolts 16. Nuts 17 are tightened on the bolts 16 so as to secure the wheel 11, the annular member 14 and the brake assembly together.

For locking the members 13, 14, and thus the wheel 11 and the axle 12, for simultaneous rotation, the members 13, 14 are formed with axially extending lugs 21, 22 respectively, and a shiftable locking element 25 is provided with projections 26 formed to closely interfit between the lugs 21, 22 when the element 25 is shifted from its unlocked FIG. 2 position to its locked FIG. 3 position. In the illustrated construction, the lugs 21, 22 are adapted to come into radial alinement to receive the projections 26 upon relative rotation of the members 13, 14. Preferably, the lugs 22 are sufficiently long so that they remain in engagement with the projections 26 in both the locked and unlocked positions of the locking element 25.

With the locking element 25 in its locked FIG. 3 position, the projections 26 present a solid interconnection between the radially alined lugs 21, 22 and thus a strong rigid connection is established between the members 13, 14 which locks the wheel 11 to the axle 12. It will be appreciated that the interfitted lugs 21, 22 and projections 26 are close to the plane of the wheel 11 so that little torque is developed in the hub. Furthermore, in the unlikely event that the locking element 25 should crack or otherwise fail, it can be seen that the projections 26 will remain solidly positioned between the lugs 21, 22 so that the hub "fails safe."

When the locking element 25 is shifted to the unlocked FIG. 2 position, the projections 26 clear the lugs 21 and there is no interconnection between the members 13, 14. The wheel 11 can thus rotate independently of the axle 12. To facilitate free rotation, nylon bearing elements 31 are interposed between the members 13, 14. A snap ring 32 is seated in the member 13 so as to sandwich the member 14 between the lugs 21 and the snap ring and thus maintain the annular members 13, 14 in their proper respective positions.

To slidably mount the element 25 and also enclose the operating parts of the hub 10, a cup-shaped housing 35 is disposed about the lugs 22 and the projections 26 so that the locking element 25 is freely slidable within the housing. An annular flange 36, formed integrally with the body of the housing 35, is turned outwardly and provided with openings so as to fit over the stud bolts 16. The nuts 17 thus rigidly lock the housing 35 with the annular member 15.

In accordance with the invention, the locking element 25 is biased toward its locked position and a cam surface-cam follower connection is provided between the locking element and a control shaft 40 for camming the locking element between locked and unlocked positions. In the preferred construction, the locking element 25 is biased by a compressed helical spring 41 that is enclosed within the housing 35 and which bears against the projections 26 so as to urge the locking element 25 toward its locked FIG. 3 position. The control shaft 40 is rotatably mounted in the housing 35 and is provided with an integral control knob 42 having a knurled peripheral surface that is easily accessible from the outside of the housing 35. A snap ring 42a is seated in the shaft 40 so that the knob 42 and the snap ring sandwich the end wall of the housing 35 to lock the control shaft against axial movement.

In the illustrated embodiment, the locking element 25 is annular and the control shaft 40 is slidably received within the locking element. Preferably, a pair of cam followers 43 are slidably mounted in a hole 44 formed in the end of the control shaft 40 and a compressed helical spring 45 is disposed between the cam followers so as to bias them in opposite directions against the inner surface of the annular locking elements 25. The spring 45 eliminates looseness and play between the parts. The cam followers 43 cooperate with a pair of generally helical cam surfaces 47 formed within the locking element 25 so that the spring 41 biases the cam surfaces 47 against the cam followers 43.

It can thus be seen that rotation of the knob 42 on the control shaft 40 causes the cam followers 43 to ride along the cam surfaces 47. The cam surfaces 47 cannot rotate about the axis of the control shaft 40 since the locking element projections 26 remain fitted between the lugs 22 in both the locked and unlocked positions of the locking element 25. Thus, rotation of the control shaft causes the cam followers 43 to cam the locking element 25 from the locked FIG. 3 position to the unlocked FIG. 2 position when the control knob 42 is rotated in a clockwise direction as seen in FIG. 1. Rotation of the control knob 42 in a counterclockwise direction allows the cam surfaces 47 to ride along the cam followers 43 under the resilient force of the spring 41 so that the locking element 25 moves from the unlocked FIG. 2 position to its locked FIG. 3 position.

Of course, if the lugs 21, 22 are not in radial alinement, the projections 26 come into abutment with the lugs 21 as the control knob 42 is rotated in a counterclockwise direction. Continued rotation of the shaft 40 thus moves the cam followers 43 clear of the cam surfaces 47. However, upon slight rotational movement of the wheel 11, the lugs 21, 22 are brought into alinement and the spring 41 then snaps the projections 26 into their locking positions between the alined lugs 21, 22. It will thus be appreciated that only the force of the spring 41 acting through the cam surface-cam follower connection must be overcome in order to rotate the control knob 42 and operate the hub 10. Since the interfitting of the lugs 21, 22 and the projections 26 results from the force exerted by the spring 41, there can be no manual or mechanical jamming of the parts when locking the hub.

As a feature of the invention, slight depressions 50 are formed at each end of the cam surfaces 47. Thus, when the cam followers 43 are swung into either their fully locked or fully unlocked positions, the spring 41 seats the cam followers in the depressions 50. This provides a resilient detenting action which prevents vibration from inadvertently shifting the position of the hub parts and which also gives the operator the feel of "snapping" the hub into locked or unlocked position. Preferably, indicia marks 51 are formed on the outer surface of the control knob 42 and are arranged to line up with corresponding indicia marks 52 formed on the end of the housing 35. The indicia marks 52 bear the respective legends 2 and 4 which indicate that the hub 10 is in locked condition when the marks 51 are alined with the 4 legends, whereas the hub is unlocked when the marks 51 are alined with the 2's. It will be obvious that the numbers 2 and 4 have reference to conditioning the hub 10 for two or four wheel drive, respectively.

For facilitating assembly of the hub 10, the locking element 25 is formed with a pair of axially extending, oppositely disposed slots 55 positioned between the cam surfaces 47 and arranged to receive the cam followers 43. This permits the locking element 25 to be easily fitted onto the control shaft 40 by sliding the locking element in the direction of the arrow 56 in FIG. 5 over the end of the control shaft with the slots 55 alined with the cam followers 43. During assembly, the locking element 25 is moved against the bias of the spring 41 until the cam followers 43 clear the end of the slots 55 whereupon the locking element is turned slightly so as to dispose the cam followers adjacent the cam surfaces 47. The assembly force is then relaxed and the force of the spring 41 brings the parts to their assembled positions with the cam surfaces 47 resiliently abutting the cam followers 43. In the illustrated construction, the ends of the slots 55 are formed with ramp portions 57 which wedge the cam followers 43 inwardly against the force of their spring 45 during the assembly operation. As will be readily apparent, the hub may be dissembled by simply reversing the above procedure.

So as to seal the interior of the housing 35 against dust and moisture, a pair of O-ring seals 60 and 61 are interposed between the control shaft 40, its control knob 42 and the housing 35. In addition, gaskets 62 and 63 are interposed between the flanges 15, 36 and the wheel 11 and the flange 15, respectively.

Those skilled in the art will appreciate that the hub 10 can be manufactured quite economically since it has few, relatively simple formed parts. The hub 10, while being quite compact, provides a solid wheel-to-axle lock and a mechanism which can be easily operated, without special tools or devices of any kind, to shift the hub between locked four-wheel-drive and unlocked two-wheel-drive positions.

I claim as my invention:

1. A hub for selectively locking a wheel on an axle comprising, in combination, a pair of interfitted annular members one secured to the axle and the other to the wheel, said members having axially extending lugs adapted to come into radial alinement upon relative rotation of said members, a housing surrounding said lugs and being secured to the outer one of said members, said housing having an opening alined with said axle, an annular locking element slidably fitted in said housing for movement axially of said members between locked and unlocked positions, said element having axially extending projections which closely interfit the lugs of one of said members in both the locked and unlocked positions of said element, said projections being formed to closely interfit the lugs on the other of said members when said locking element is advanced to its locked position between said members while the lugs of said members are in radial alinement, biasing means within said housing and bearing against said element to urge it toward its locked position, a control shaft rotatably extending axially through said annular locking element and projecting outwardly through said opening in said housing, said control shaft being rotatably mounted with respect to said locking element, a control knob secured to the end of said shaft outside said housing, a pair of diametrically opposed cam followers mounted in said control shaft within said annular locking element, a single spring member mounted within said control shaft between the cam followers and biasing said cam followers radially outwardly toward said locking element, said locking element having a pair of corresponding helical cam surfaces on the inner periphery thereof abutting said cam followers under the urging of said biasing means, said surfaces being formed to cam said locking element against said bias from locked to unlocked positions upon rotation of said control knob, said cam surfaces also having slight depressions at each end thereof so as to resiliently seat said cam followers under the urging of said spring member in both the locked and unlocked positions.

2. A hub for selectively locking a wheel on an axle comprising, in combination, a pair of interfitted annular members one secured to the axle and the other to the wheel, said members having axially extending lugs adapted to come into radial alinement upon relative rotation of said members, a cup-shaped housing surrounding said lugs and being secured to the outer one of said members, an annular locking element slidably fitted in said housing for movement axially of said members between locked and unlocked positions, said element having axially extending projections which closely interfit the lugs on said outer member in both the locked and unlocked positions of said element, said projections being formed to closely interfit the inner one of said members when the lugs of said members are in radial alinement and the element is in locked position, a helical spring compressed within said housing and bearing against said element to urge it toward its locked position, and a control shaft rotatably mounted in said housing and having a control knob accessible from the outside of said housing, said shaft extending into said annular element and having oppositely extending and outwardly biased cam followers, said element having a pair of corresponding helical cam surfaces abutting said cam followers under the urging of said spring, said surfaces being formed to slide said element between said locked and unlocked positions upon rotation of said control knob, said element also having a pair of axially extending, oppositely disposed slots between said cam surfaces for receiving said cam followers and permitting the element to be fitted onto said control shaft.

References Cited by the Examiner

UNITED STATES PATENTS

| | | | |
|---|---|---|---|
| 2,383,119 | 8/45 | Ferris | 287—53 |
| 2,788,103 | 4/57 | Requa | 192—67 |
| 2,844,238 | 7/58 | Peterson | 192—67 |
| 2,894,775 | 7/59 | Harless | 287—108 |
| 2,948,557 | 8/60 | Howe et al. | 287—53 |
| 3,124,377 | 3/64 | O'Brien et al. | 287—53 |

CARL W. TOMLIN, *Primary Examiner.*

WALTER A. SCHEEL, *Examiner.*